United States Patent
Laurenti et al.

(10) Patent No.: US 8,307,344 B2
(45) Date of Patent: Nov. 6, 2012

(54) SLIDING GRANULARITY TIME STAMPING

(75) Inventors: Gilbert Laurenti, Saint Paul de Vence (FR); Gary A. Cooper, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 1104 days.

(21) Appl. No.: 12/201,037

(22) Filed: Aug. 29, 2008

(65) Prior Publication Data

US 2009/0204951 A1 Aug. 13, 2009

(30) Foreign Application Priority Data

Feb. 8, 2008 (EP) .................................. 08290124

(51) Int. Cl.
*G06F 9/44* (2006.01)

(52) U.S. Cl. ........ 717/128; 717/127; 717/131; 717/143; 717/154

(58) Field of Classification Search ........................ None
See application file for complete search history.

(56) References Cited

U.S. PATENT DOCUMENTS 7,441,154 B2 * 10/2008 Klotz et al. ..................... 714/39

OTHER PUBLICATIONS

MIPI Alliance, Inc. "MIPI Allance Test and Debug—NIDnT-Port", White paper, Approved Version: 1.0, Jan. 10, 2007, pp. 1-13.
MIPI Alliance, Inc. "MIPI Allance Test and Debug Interface Framework", White paper, Approved Version: 3.2, Apr. 7, 2006, pp. 1-11.

* cited by examiner

*Primary Examiner* — Chuck Kendall
(74) *Attorney, Agent, or Firm* — Ronald O. Neerings; Wade James Brady, III; Frederick J. Telecky, Jr.

(57) ABSTRACT

In a method for tracing data within an integrated circuit, a default time stamp granularity is selected for a sequence of time stamps, wherein each time stamp has a resolution of $2^{}N$. A sequence of trace events is captured and an elapsed time is determined between each time sequential pair of trace events in the sequence of trace events. A time stamp is formed to associate with each trace event of the sequence of trace events, wherein each time stamp has an associated time stamp granularity, wherein the time stamp has the default time stamp granularity if the elapsed time between a current trace event and a sequentially prior trace event is less than $2^{}N$ time slots, otherwise the time stamp granularity is slid to a larger value such that the elapsed time can be represented by N bits, whereby a small number N of bits can accurately represent a large range of elapsed times.

16 Claims, 6 Drawing Sheets

| D[31:24] | | D[23:16] | | D[15:8] | | D[7:0] | |
|---|---|---|---|---|---|---|---|
| D6 | D5 | D4 | D3 | D2 | D1 | D0 | T1 |
| T0 | D16 | D3 | D2 | D1 | D0 | MASTER | M1 |
| M0 | D32TS | D7 | D6 | D5 | D4 | D3 | D2 |
| D1 | D0 | T1 | T0 | LTSG | G | D32 | D7 |
| D6 | D5 | D4 | D3 | D2 | D1 | D0 | C8 |

| D[48:51] | D[47:44] | D[39:32] TIME STAMP | | D[31:24] | D[23:16] | D[15:8] | | D[7:0] | |
|---|---|---|---|---|---|---|---|---|---|
| D16 | | MESSAGE NOT FULLY CAPTURED INTO ETB | | | | D3 | D2 | D1 | D0 |
| D32 | | | | D7 | D6 | D5 | D4 | D3 | D2 | D1 | D0 |
| D32TS | LTSG | T1 | T0 | D7 | D6 | D5 | D4 | D3 | D2 | D1 | D0 |
| D16 | | | | | | D3 | D2 | D1 | D0 |
| MASTER | | | | | | | | M1 | M0 |
| D16TS | LTSG | T1 | T0 | | | D3 | D2 | D1 | D0 |
| D16 | 324 | | | | | D3 | D2 | D1 | D0 |
| C8 | | | | | | | | C1 | C0 |
| MASTER | | | | | | | | M1 | M0 |

SLIDING GRANULARITY TIME STAMPING

CLAIM OF PRIORITY

This application for Patent claims priority to European Patent Application No. 08290124.0 entitled "Sliding Granularity Time Stamping" filed Feb. 8, 2008, incorporated by reference herein.

FIELD OF THE INVENTION

This invention generally relates to application software development, software integration, and system optimization of complex integrated circuits and in particular to tracing hardware and software events.

BACKGROUND OF THE INVENTION

Testing and debugging of a new application specific integrated circuit (ASIC) or of a new or modified application program running on an ASIC requires insight into the internal workings of busses and program execution. The IEEE 1149.1 (JTAG) standard has proven to be a very robust solution to a variety of test and debug systems, enabling a rich ecosystem of compliant products to evolve across virtually the entire electronics industry. Yet increasing chip integration and rising focus on power management has created new challenges that were not considered when the standard was originally developed. The Mobile Industry Processor Interface (MIPI) Test and Debug Working group has selected a new test and debug interface, called P1149.7, which builds upon the IEEE1149.1 standard. P1149.7 enables critical advancements in test and debug functionality while maintaining compatibility with IEEE 1149.1. In addition to P1149.7, the MIPI test and debug interface specifies how multiple on-chip test access port (TAP) controllers can be chained in a true IEEE1149.1 compliant way. It also specifies a System Trace Module (STM). STM consists of a System Trace Protocol (STP) and the Parallel Trace Interface (PTI). The signals and pins required for these interfaces are given through the 'MIPI Alliance Recommendation for Test & Debug—Debug Connector', also part of the MIPI test and debug interface. The main blocks of the MIPI Debug and Trace Interface (DTI), seen from outside of the system, include: a debug connector; the basic debug access mechanism: JTAG and/or P1149.7; a mechanism to select different TAP controllers in a system (Multiple TAP control); and a System Trace Module.

The System Trace Module helps in software debugging by collecting software debug and trace data from internal ASIC buses, encapsulating the data, and sending it out to an external trace device using a minimum number of pins. STM supports the following features:

Highly optimized for SW generated traces
Automatic time stamping of messages
Allows simultaneous tracing of 255 threads without interrupt disabling
Configurable export width 1/2/4 pin+dedicated clock+optional return channel
  Minimal pin usage 2 pin (1 data+1 clock)
  Maximum pin usage 6 pins (4 data+1 clock+1 return channel)
Maximum planned operating frequencies 166 MHz (double data rate clocking)
Provides a maximum bandwidth of slightly above 1 Gbit/s (theoretical max. 1.6 Gbit/s)
Supports up to 255 HW trace sources
Support for 8, 16, 32 and 64 bit data types A maximum of 255 different bus masters can be connected to the STM trace port via a bus arbiter. The bus masters can be configured for either SW or HW type to optimize the system for different types of trace data. SW type master messages are used to transmit trace data from OS processes/tasks on 256 different channels. The different channels can be used to logically group different types of data so that it is easy to filter out the data irrelevant to the ongoing debugging task. The message structures in STM are highly optimized to provide an efficient transport especially for SW type master data.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

In order to test and debug a new application specific integrated circuit (ASIC) or a new or modified application program running on an ASIC, various events that occur during execution of an application or a test program are traced and made available to external test equipment for analysis. Embodiments of the present invention provide a scheme to associate a time stamp with each event in order to allow the external test equipment to interpret the stream of data that is provided by the trace module on the ASIC.

A default time stamp granularity is selected which defines the minimum elapsed time between events that can be represented. The time stamp is represented by a digital value, wherein each time stamp has a resolution of $2**N$ (also represented as $2^N$). In order to minimize the bandwidth required to transmit the time stamp via the Parallel Trace Interface (PTI), it is beneficial to make N as small as possible. In this embodiment, N is defined to be eight, so that each time stamp has a resolution of 256 possible time values. The actual elapsed time represented by the time stamp is then determined by multiplying the time stamp value by the time stamp granularity.

A time stamp is formed to associate with each trace event of a sequence of trace events. The time stamp has the default time stamp granularity if the elapsed time between a current trace event and a sequentially prior trace event is less than $2^N$ time slots, otherwise the time stamp granularity is slid to a larger value such that the elapsed time can be represented by N bits. In this manner, a small number N of bits can accurately represent a large range of elapsed times.

Time stamp encoding may be encapsulated in the already specified Mobile Industry Processor Interface (MIPI) message System Trace Protocol (STP) structure and therefore does not require a complete rework of the external trace decoder, since the current MIPI STP structure assumes a different type of time stamp format that does not envision sliding the time stamp granularity value. Only the interpretation of the time stamp (TS) field would need to be modified. This allows compatible operation with STP and other protocols as of today unknown.

The resolution is self adjusted according to the elapsed time between debug trace events by sliding the time stamp granularity to a larger value. In this manner, there is no bandwidth penalty when the events are close together and there is significant amount of trace data to export. As long as the elapsed time can be represented by the default time stamp granularity then no additional message signaling is required beyond the eight-bit time stamp value.

An additional message signaling the time stamp granularity is only required when the distance between events becomes larger and therefore when the trace throughput requirements are being relaxed. Table 1 illustrates an encoding of time stamp granularity used in the current embodiment. A four-bit granularity message indicates what scaling factor is to be applied to an associated time stamp. Granularity is scaled upward by $2^1$ for the first six shifts. Thus, the elapsed time range from 256 time slots for the default granularity up to 64×256=16,384 time slots is covered by sliding the time stamp granularity in increments of $2^1$. For elapsed time values beyond 16,384 time slots, the time stamp granularity slides upward in increments of $2^2$ for the remaining time range up to a value of $2^{24}$, which is equivalent to 16,777,216. Thus, a maximum elapsed time value of $2^{24} \times 255$ time slots ($2^{32}$) can be represented. An elapsed time greater than this is treated as an overflow and is represented by all ones in the time stamp and the times stamp granularity fields.

TABLE 1

Local time stamp granularity signaling

| STP Message Header | G[3:0] | Local Time Stamp granularity | 8-bit TS Window Shift | Granularity Scaling Factor |
|---|---|---|---|---|
| LTSG | 0x0 | Default = finest granularity Instrumentation Port clock frequency/n | 0 | 1 |
|  | 0x1 |  | 1 | 2 |
|  | 0x2 |  | 2 | 4 |
|  | 0x3 |  | 3 | 8 |
|  | 0x4 |  | 4 | 16 |
|  | 0x5 |  | 5 | 32 |
|  | 0x6 |  | 6 | 64 |
|  | 0x7 |  | 8 | 256 |
|  | 0x8 |  | 10 | 1024 |
|  | 0x9 |  | 12 | 4096 |
|  | 0xA |  | 14 | 16384 |
|  | 0xB |  | 16 | 65536 |
|  | 0xC |  | 18 | 262144 |
|  | 0xD |  | 20 | 1048576 |
|  | 0xE |  | 22 | 4194304 |
|  | 0xF |  | 24 | 16777216 |

This efficient time stamp encoding maximizes the trace history depth when stored into on-chip buffer. Other embodiments may use different scaling encodings to increment the scaling at different rates than shown in Table 1. Another embodiment may use fewer or more bits for the granularity message. Yet another embodiment may use fewer or more bits for the time stamp field. Thus, the relative time stamp accuracy is preserved regardless of the event elapsed time distance over a time range of $0$-$2^{32}$ time slots while using only an eight-bit time stamp in this embodiment.

Figure 1:
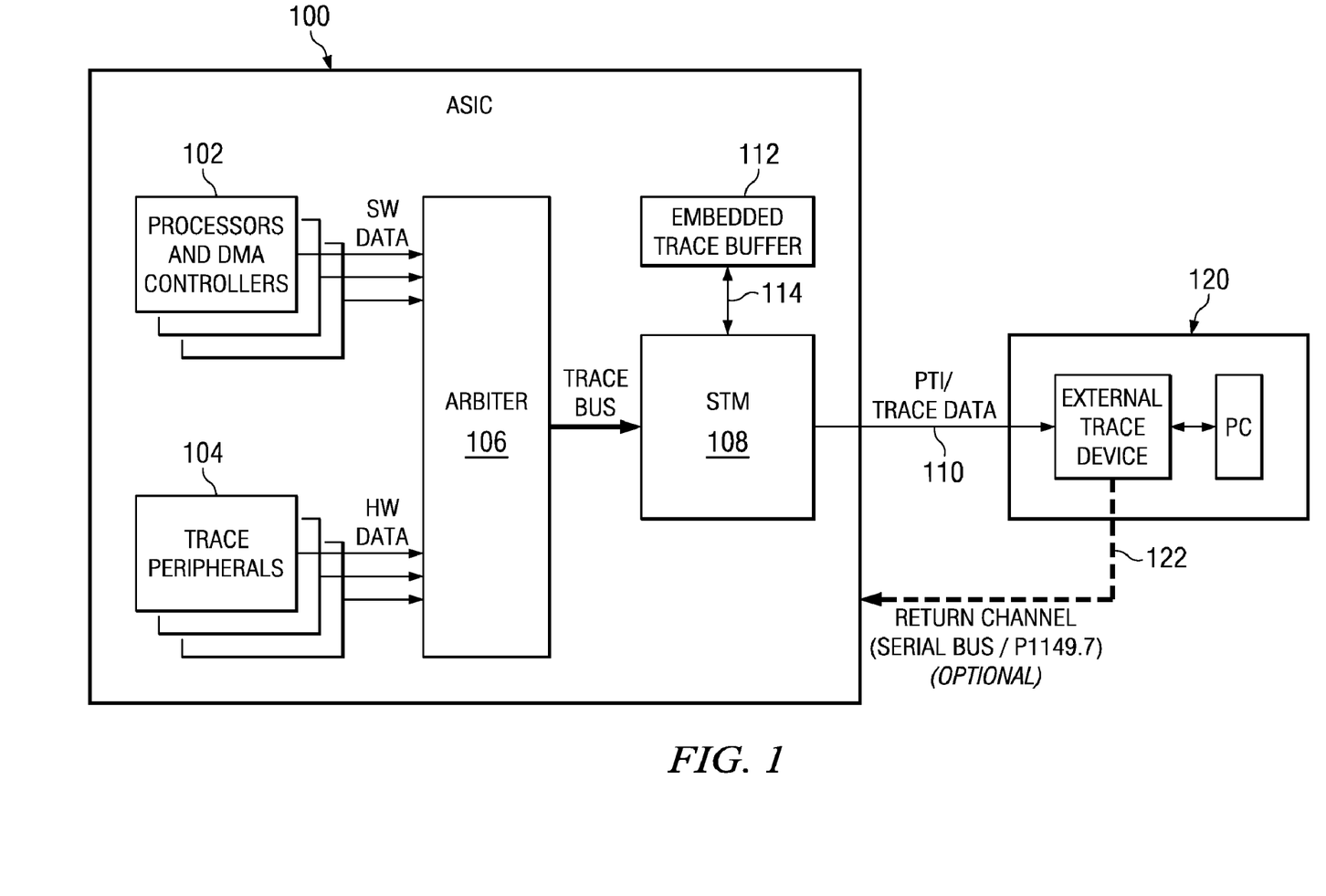
FIG. 1 is a block diagram illustrating a exemplary application specific integrated circuit (ASIC) with a system trace module (STM) and an embedded trace buffer (ETB)

FIG. 1 is a block diagram illustrating a exemplary application specific integrated circuit (ASIC) 100 with a system trace module (STM) 108 and an embedded trace buffer (ETB) 112. For purposes of this disclosure, the somewhat generic term "ASIC" is used to apply to any complex system on a chip (SOC) that may include one or more processors and DMA (direct memory access) controllers 102 and may also include one or more peripherals 104 any of which may generate trace events that are useful for debugging the ASIC or an application running on the ASIC. Event tracing in general is well known and will not be described in further detail herein.

In this embodiment, an arbiter 106 collects the various trace events, prioritizes them, and provides them to the system trace module for further processing. In this embodiment, STM 108 can operate in two different modes. When an external trace device is connected to ASIC 100 via interconnect 110, the STM may transmit sequences of trace events and time stamps directly to external trace receiver 120 as they are received. Interconnect 110 may include signal traces on a circuit board or other substrate that carries ASIC 100 which connect to a parallel trace interface (PTI) provided by ASIC 100, as discussed earlier. Interconnect 110 may include a connector to which a cable or other means of connecting to external trace receiver 120 is coupled. An optional return channel 122 such as serial bus/P1149.7 may be used to provide control information from external trace device 120 to ASIC 100.

In a second mode of operation, an external trace device may not be connected to ASIC 100 during a trace capture episode, or there may not be a provision for connecting an external trace device. In this mode, STM 108 transmits the sequences of trace data and associated time stamps to an embedded trace buffer (ETB) within ASIC 100 via an internal bus or other interconnect 114. In this case, after a debug session, the contents of ETB 112 may be transferred to another device by using another interface included within ASIC 100, such as via a USB (universal serial bus) for example. Alternatively, after a debug session an external trace receiver 120 may then be connected to ASIC 100 and the contents of ETB 112 may be accessed by STM 108 and then transmitted to external trace device 120 via interconnect 110.

In one embodiment of the invention, when a sequence of trace events and time stamps are transmitted directly to external trace receiver 120 in the first mode, the time stamps are formed using a format that does not comprise sliding time stamp granularity values. In another embodiment, time stamps transmitted directly to the external trace device do comprise sliding time stamp granularity values as described herein.

Figure 2A:
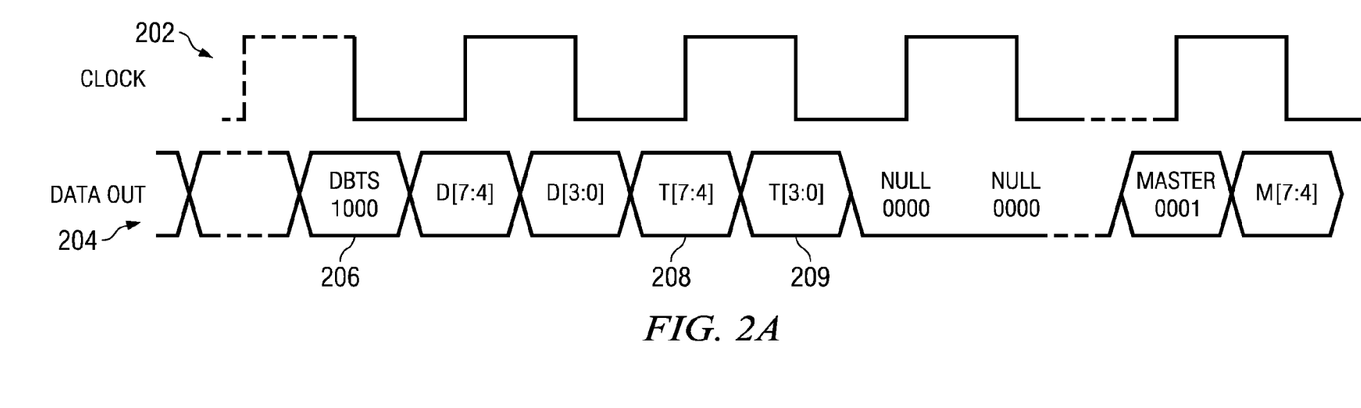
FIG. 2A is a timing diagram illustrating a data stream conforming to STP format which includes a time stamp using sliding time stamp granularity.

FIG. 2A is a timing diagram illustrating a data stream 204 conforming to STP format which includes a time stamp 208-209 comprising sliding time stamp granularity. The STP format transmits four bits on four-bit interconnect 110 during each phase of clock signal 202. In this instance, a D8TS (eight-bit data and a time stamp) message identifier 206 indicates an eight bit trace data value and a time stamp follows. Since there is no granularity message, eight-bit time stamp 208-209 is interpreted as having a default granularity, which is the finest granularity.

Figure 2B:
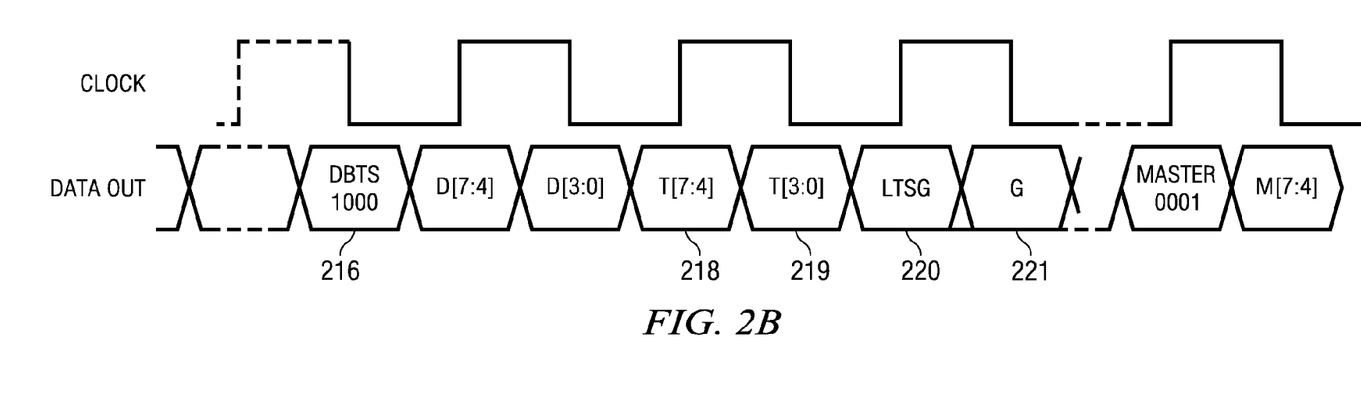
FIG. 2B is another timing diagram illustrating an STP data stream that includes a local time stamp granularity (LTSG) message.

FIG. 2B is another timing diagram illustrating an STP data stream that includes a local time stamp granularity (LTSG) 220 message. In this instance, D8TS message identifier 216 is accompanied by LTSG message 220. Four-bit granularity value 221 is interpreted as defined in Table 1. Eight-bit time stamp 218-219 is scaled by a granularity value from Table 1 that is indicated by LTSG 220-221.

Figure 3A:
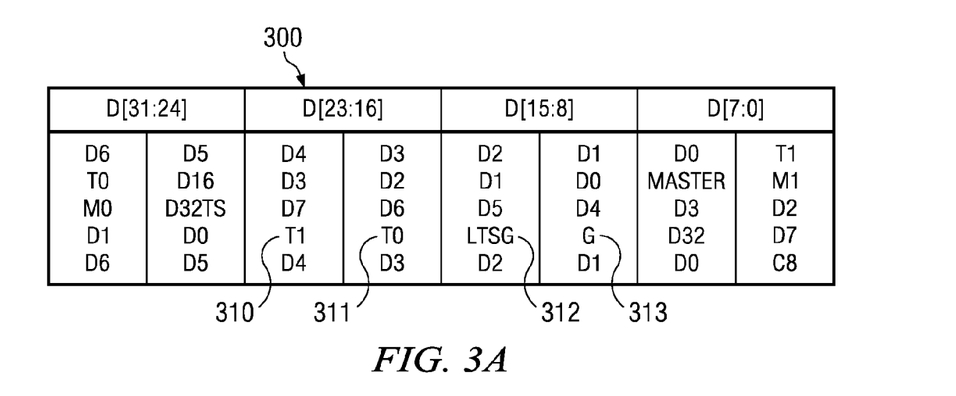
FIG. 3A is an illustration of a portion of an ETB for use in the ASIC of FIG. 1.

FIG. 3A is an illustration of a storage portion 300 of ETB 112 for use in the ASIC of FIG. 1. In this embodiment, ETB 112 is 32 bits wide, as indicated by portion 300. Sequences of trace events and associated time stamps are packed into the ETB as illustrated. In this instance, an LTSG message 312-313 is included with time stamp 310-311 to indicate the eight-bit time stamp value is to be scaled by the sliding granularity value indicated by LTDG 312-313. In one embodiment, ETB 112 may be 32 kbytes. In another embodiment it may be larger, or smaller as appropriate.

Figure 3B:
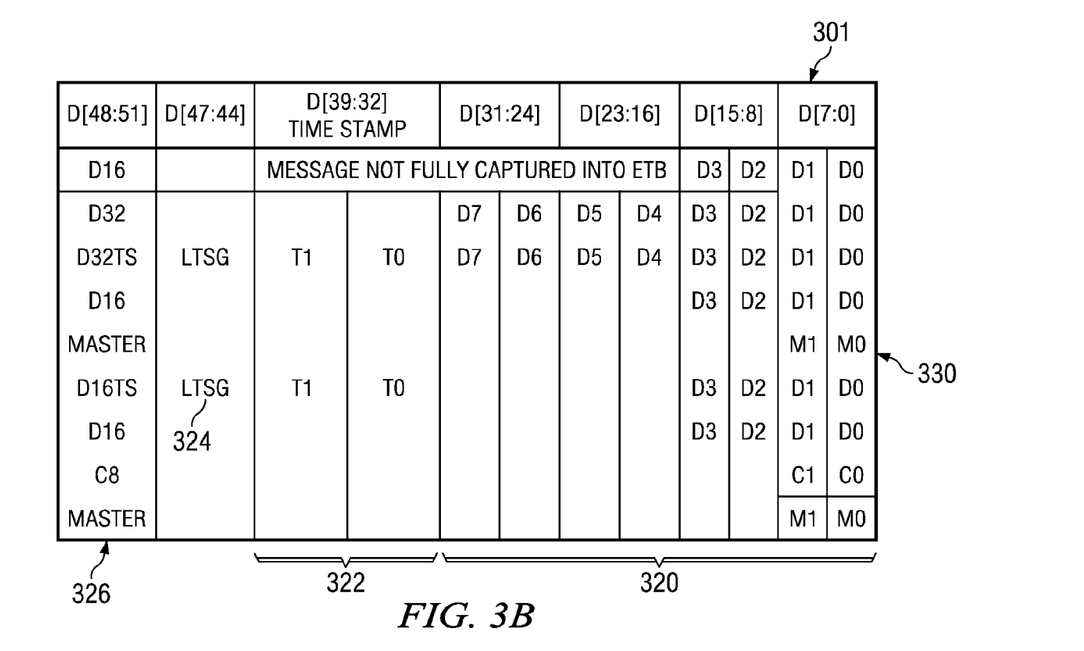
FIG. 3B is an illustration of an embodiment of an elastic buffer in the STM.

FIG. 3B is an illustration of an embodiment of an elastic buffer 301 that forms an output buffer for STM 108 in FIG. 1. As trace events are captured and time stamps are formed by STM 108, they are stored in elastic buffer 301 for transmission to an external trace device via interconnect 110 In this embodiment, elastic buffer 301 is 52-bits wide and each line, such as line 330, stores one trace event and associated time stamp. Portion 320 is used to store trace event data and portion 322 stores eight-bit time stamp values. LTSG granularity values are stored in the next column, as indicated by exemplary LTSG message 324. Message identification messages, which conforms to STP message headers, are stored in the final column 326.

Figure 4A:
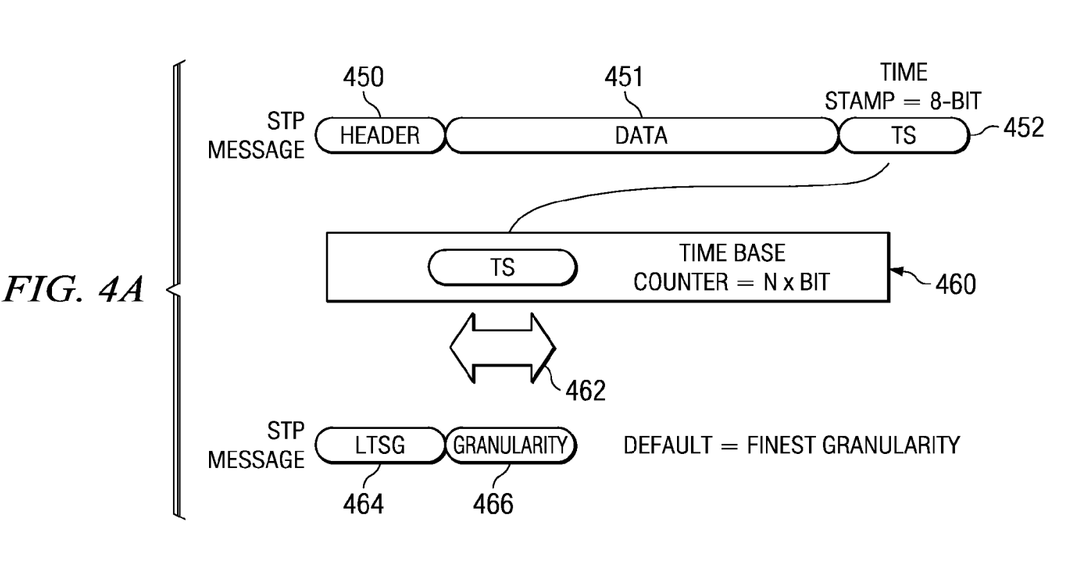
FIG. 4A illustrates sliding of the time stamp across a time counter by scaling the granularity of the time stamp in the STM of FIG. 1.

FIG. 4A illustrates sliding of eight-bit time stamp 462 across a time counter 460 by scaling the granularity of the time stamp in the STM of FIG. 1, as described above. In this embodiment, time base counter 460 is a 32-bit counter. Time base counter 460 is located within STM 108 in this embodiment. Time base counter 460 is reset after each trace event is captured and provides an indication of elapsed time between trace events. As the elapsed time increases between two events, the time stamp is effectively slid across the time base counter by dropping less significant bits of the count value. As described above, an LTSG message 464 includes a granularity value 466 that indicates what the granularity of a given time stamp is.

Figure 4B:
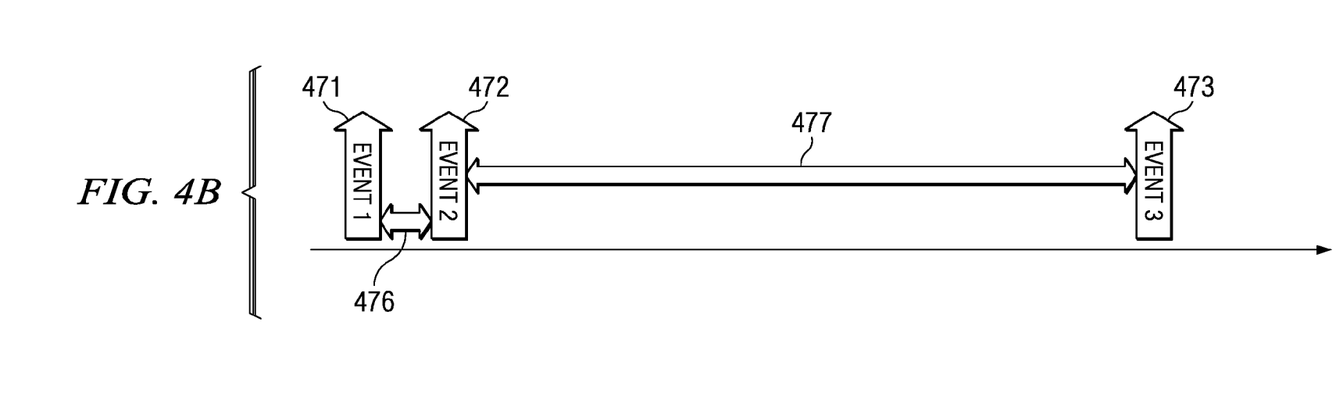
FIG. 4B illustrates event separation aspects of the time stamp.

FIG. 4B illustrates event separation aspects of the time stamp. In this example, three trace events 471-473 are captured. An elapsed time 476 between events 471 and 472 is less than 256 time slots and can therefore be represented directly by the eight-bit time stamp. As used herein, the term "time slot" refers to one count of time base counter 460. The next event 473 occurs at an elapsed time 477 that is greater than 256 time slots and therefore cannot be represented directly by an eight-bit time stamp value. As described above, the time stamp will be effectively slid across the time base counter by dropping less significant bits and thereby increasing the time stamp granularity until the eight-bit time stamp can represent the elapsed time value. In order to maintain as much accuracy as possible, the time stamp granularity is increased by no more than is required to represent in N-bits the elapsed time between the current trace event and the sequentially prior trace event, where in this embodiment N=8.

Figure 5A:
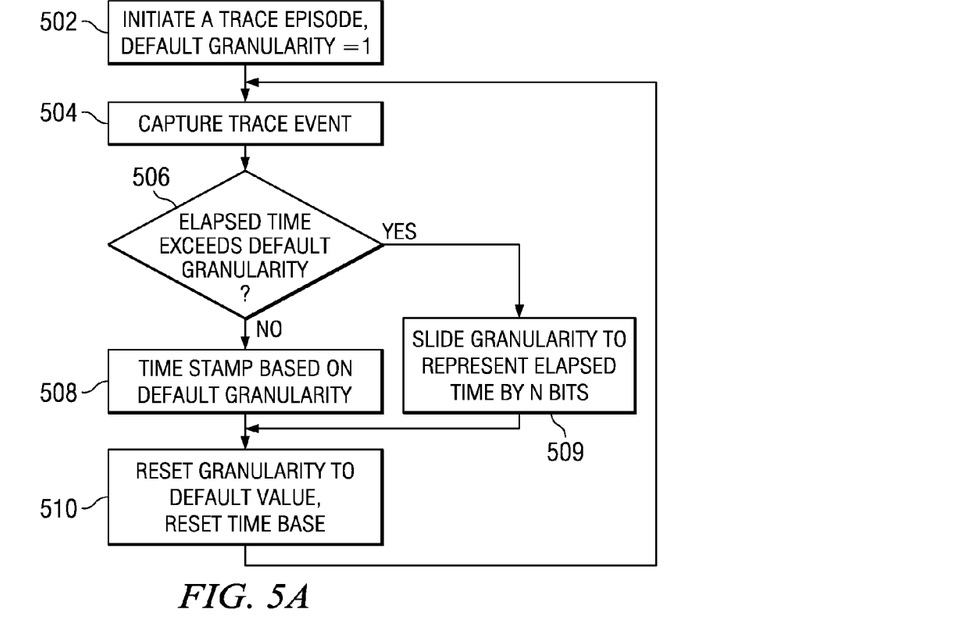
FIG. 5A is a flow chart illustrating operation of sliding granularity in an embodiment of the STM of FIG. 1.

FIG. 5A is a flow chart illustrating operation of sliding granularity in an embodiment of STM 108. A default granularity is defined 502 when a trace episode is initiated. In this embodiment the default granularity is one, which is the finest granularity, so that an eight-bit time stamp can directly represent up to 256 time slots of time base counter 460. A trace episode generally includes executing a program within ASIC 100 that generates a sequence of trace events and includes enabling operation of STM 108. As each trace event is captured 504, a time stamp is formed to indicate the elapsed time between the current trace event and the preceding trace event. The user is mainly looking at event separation, so the time stamp of the first event after STM enabling may not be of interest and can therefore be reported as "00" and considered as the reference point.

As each trace event is captured 504, the elapsed time as indicated by time base counter 460 is examined to determine 506 if it exceeds a time that can be represented using the default time base granularity. If not, then a time stamp is formed 508 that is based on the default time base granularity. However, if the elapsed time exceeds $2^N$ time slots, where N represents the size of the time stamp value, then the time stamp granularity is slid to a larger value such that the elapsed time can be represented by N bits, whereby a small number N of bits can accurately represent a large range of elapsed times. In this embodiment, N=8. In this embodiment, sliding the granularity 509 is performed in one step such that it is increased no more than is required to represent in N bits the elapsed time between the current trace event and the sequentially prior trace event.

After forming each time stamp, the time stamp granularity is reset 510 to the default value and the time local base is reset. In this manner, trace events that are separated by an elapsed time that exceeds $2^N$ time slots will require an LTSG message to define the granularity, but trace events that occur closer together than $2^N$ time slots do not require an LTSG message. Thus, during high capture rates, the time stamp size is minimized so that trace data transfer rates are not impacted.

Figure 5B:
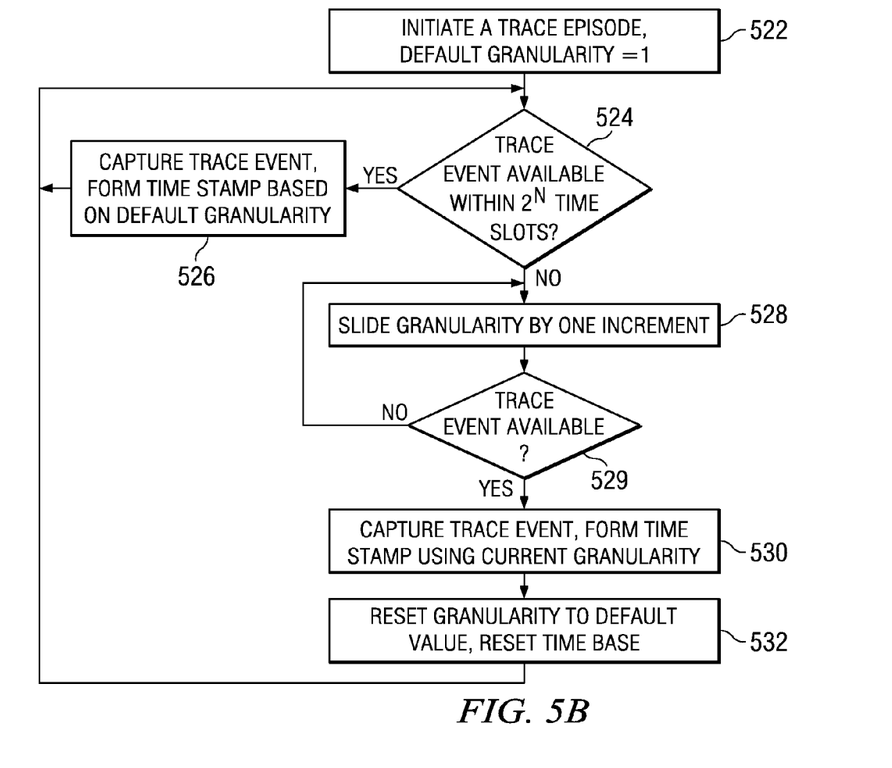
FIG. 5B is a flow chart illustrating an alternative embodiment for sliding granularity.

FIG. 5B is a flow chart illustrating an alternative embodiment for sliding granularity. In this embodiment, sliding the granularity is performed iteratively. If there is a trace event available 524 within the the first $2^8\times$ slots, the STM does not emit the LTSG message, captures the trace event, forms a time stamp using the default granularity 526. In this case the default granularity is interpreted by the debugger as the finest one. If there is no new trace event available 524 within the first $2^8\times$ slots, then the STM will scale up granularity 528 by a $2^1\times$ factor. If there is a single or a burst trace event available 529 to be encapsulated in a time stamped STP message within the next $2^9\times$ slots the STM will store into the buffer the hardware or software master instrumentation transaction 530, extend the TS capture with the current time stamp granularity 530, switch back to default granularity 532, and reset the local time base 532. If there is no new trace event available 529 within the next $2^9\times$ slots, the STM will scale up granularity 528 by a $2^1\times$ factor. If there is a single or burst access trace event available 529 to be encapsulated in a time stamped STP message within the next $2^{10}\times$ slots the STM will store into the buffer the hardware or software master instrumentation transaction 530, extend the TS capture with the current time stamp granularity 530, switch back to default granularity 532 and reset the local time base 532. This iterative process is repeated until either a trace event is captured or a time stamp overflow condition occurs. As mentioned earlier, the 8-bit time stamp window can get 16× positions as defined in Table 1. Note that when the granularity scaling factor reaches 64, if further scaling is required it is made by a 4× factor instead to 2× in order to keep the LTSG message as compact as possible. In this embodiment, sliding the granularity 528 is performed iteratively such that it is increased no more than is required to represent in N bits the elapsed time between the current trace event and the sequentially prior trace event.

System Application

Figure 6:
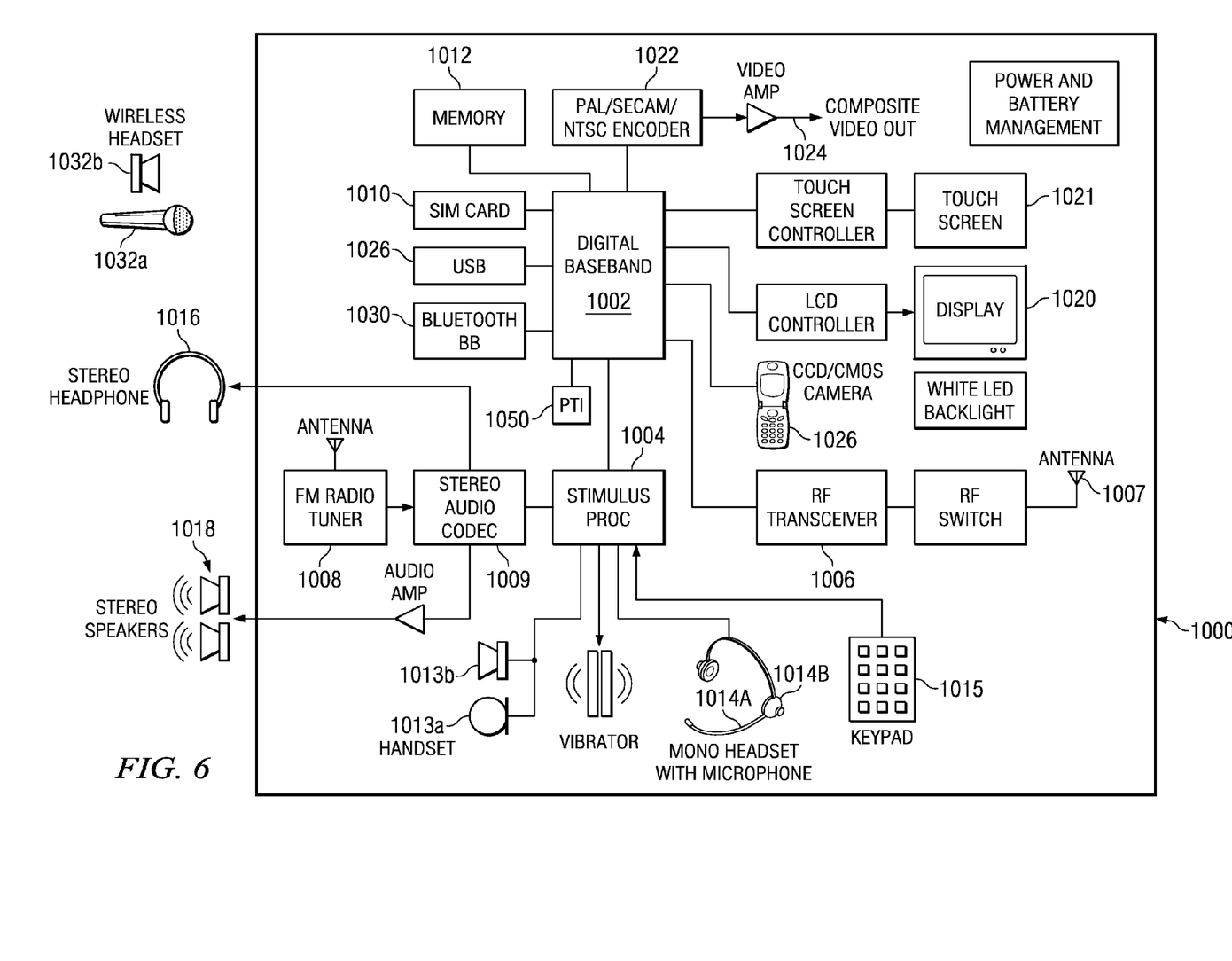
FIG. 6 is a block diagram illustrating a system that includes an embodiment of an ASIC with an STM.

FIG. 6 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. Control information is transmitted using the PUCCH. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unit 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

DBB 1002 contains an STM and embedded trace buffer as described above with respect to FIGS. 1-5. The STM is coupled to the DSP and various peripherals internal to DBB 1002 and is operable to collect trace events to aid in debugging the various DSP radio tasks described above. A sequence of trace events and time stamps can be transmitted to an external trace receiver when one is coupled to PTI connector 1050. When an external trace receiver is not coupled to PTI connector 1050, then the stream of trace events and time stamps formed with sliding time stamp granularity may be stored in the embedded trace buffer. From there, the stream of trace events and time stamps may be transferred to an external analysis device via USB port 1026 or Bluetooth port 1030, for example.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, another embodiment may use another test and debug interface that is not related to MIPI. In various embodiments, narrow or wide versions of P1149.7 may be used. Other embodiments may use interconnects that are not P1149.7 based.

In some embodiments, the ASIC may be mounted on a printed circuit board. In other embodiments, the ASIC may be mounted directly to a substrate that carries other integrated circuits. Various sizes and styles of connectors may be used for connection to an external trace receiver.

It is therefore contemplated that the appended claims will cover any such modifications of the embodiments as fall within the true scope and spirit of the invention.

What is claimed is:

1. A method for tracing data within an integrated circuit, comprising:
    selecting a default time stamp granularity for a sequence of time stamps, wherein each time stamp has a resolution of $2^N$;
    capturing a first sequence of trace events;
    determining an elapsed time between each time sequential pair of trace events in the first sequence of trace events; and
    forming a time stamp to associate with each trace event of the first sequence of trace events, wherein each time stamp has an associated time stamp granularity, wherein the time stamp has the default time stamp granularity if the elapsed time between a current trace event and a sequentially prior trace event is less than $2^N$ time slots, otherwise sliding the time stamp granularity to a larger value such that the elapsed time can be represented by N bits, whereby a small number N of bits can accurately represent a large range of elapsed times.

2. The method of claim 1, wherein N has a value of eight or less.

3. The method of claim 1, further comprising storing the first sequence of trace events and a corresponding first sequence of time stamps in a buffer within the integrated circuit.

4. The method of claim 1, further comprising storing a granularity message only when a corresponding one of the sequence of time stamps has a time stamp granularity different from the default time stamp granularity.

5. The method of claim 4, further comprising:
transmitting the first sequence of trace events and the first sequence of time stamps to a trace receiver external to the integrated circuit; and
transmitting a granularity message only when a corresponding one of the first sequence of time stamps has a time granularity different from the default time granularity.

6. The method of claim 1, wherein sliding the time stamp granularity comprises increasing the granularity by no more than is required to represent in N bits the elapsed time between the current trace event and the sequentially prior trace event.

7. The method of claim 6, wherein time stamp granularity is increased incrementally as needed by factors of $2^1$ over a first range of time.

8. The method of claim 7, wherein time granularity is increased incrementally as needed by factors of $2^2$ for an elapsed time exceeding the first range of time.

9. The method of claim 1, further comprising a second mode for tracing data within the integrated circuit, comprising:
capturing a second sequence of trace events; and
forming a time stamp to associate with each trace event in the second sequence of trace events to form a second sequence of times stamps, wherein the second sequence of time stamps do not comprise sliding time stamp granularity values.

10. The method of claim 1, wherein the first sequence of time stamps is formed while an external trace receiver is not connected to the integrated circuit.

11. A method for tracing data within an integrated circuit (IC), comprising capturing a trace event;
exporting immediately the trace event to a trace receiver external to the IC or storing the trace event in a trace buffer internal to the IC; and
forming a time stamp to associate with the trace event, wherein the time stamp has a first format when the trace event is stored in the internal trace buffer and has a different second format when the trace event is exported immediately.

12. The method of claim 11, wherein forming the time stamp with the first format comprises:
selecting a default time stamp granularity, wherein the each time stamp has a resolution of $2^N$;
capturing a sequence of trace events;
determining an elapsed time between each time sequential pair of trace events; and
forming a time stamp to associate with each trace event of the sequence of trace events, wherein each time stamp has an associated time stamp granularity, wherein the time stamp has the default time stamp granularity if the elapsed time between a current trace event and a sequentially prior trace event is less than $2^N$ time slots, otherwise sliding the time stamp granularity to a larger value such that the elapsed time can be represented by N bits, whereby a small number N of bits can accurately represent a large range of elapsed times.

13. The method of claim 12, wherein forming the time stamp with the second format does not comprise sliding time stamp granularity values.

14. A digital system comprising an integrated circuit, wherein the integrated circuit comprises:
at least one processing module operable to generate hardware or software events for tracing;
a system trace module connected to receive trace events from the at least one processing module, wherein the system trace module is operable to form a time stamp to associate with each trace event;
an embedded trace buffer coupled to the system trace module operable to store a sequence to trace events and a sequence of time stamps from the system trace module; and
a port coupled with the system trace module and the embedded trace module for transmitting the sequence of trace events and the sequence of time stamps to an external trace receiver; and
wherein the system trace module is operable to determine an elapsed time between each time sequential pair of trace events; and
is operable to form a time stamp to associate with each trace event of the sequence of trace events, wherein each time stamp has an associated time stamp granularity, wherein the time stamp has the default time stamp granularity if the elapsed time between a current trace event and a sequentially prior trace event is less than $2^N$ time slots, otherwise sliding the time stamp granularity to a larger value such that the elapsed time can be represented by N bits, whereby a small number N of bits can accurately represent a large range of elapsed times.

15. The digital system of claim 14, wherein the system trace module is operable to store a granularity message only when a corresponding one of the sequence of time stamps has a time stamp granularity different from the default time stamp granularity.

16. The digital system of claim 14 being a cellular telephone, further comprising a connector coupled to the port for connecting to an external trace receiver.

* * * * *